Jan. 25, 1949. J. F. KENDRICK 2,460,131
NUT OR BOLT LOCK
Filed Jan. 19, 1944 2 Sheets-Sheet 2
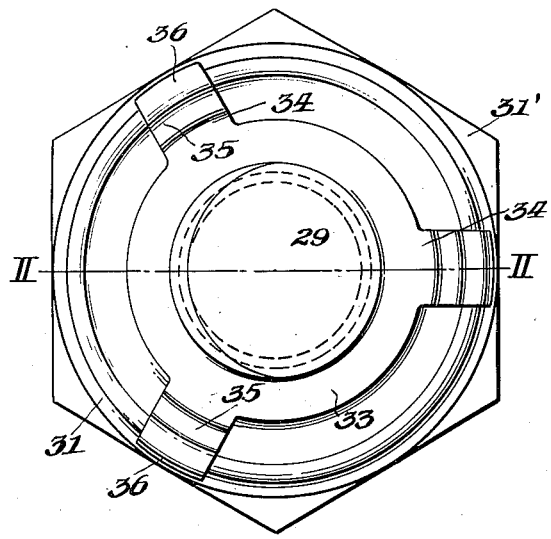
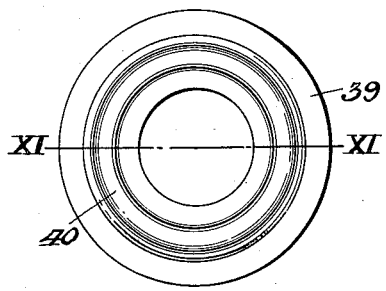
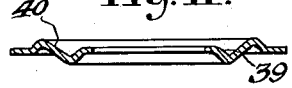
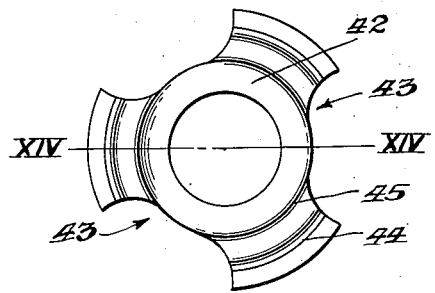
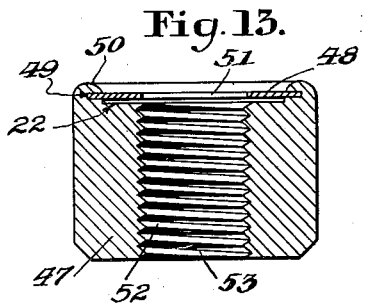
Inventor
*John F. Kendrick,*
By *W. S. McDowell*
Attorney Patented Jan. 25, 1949

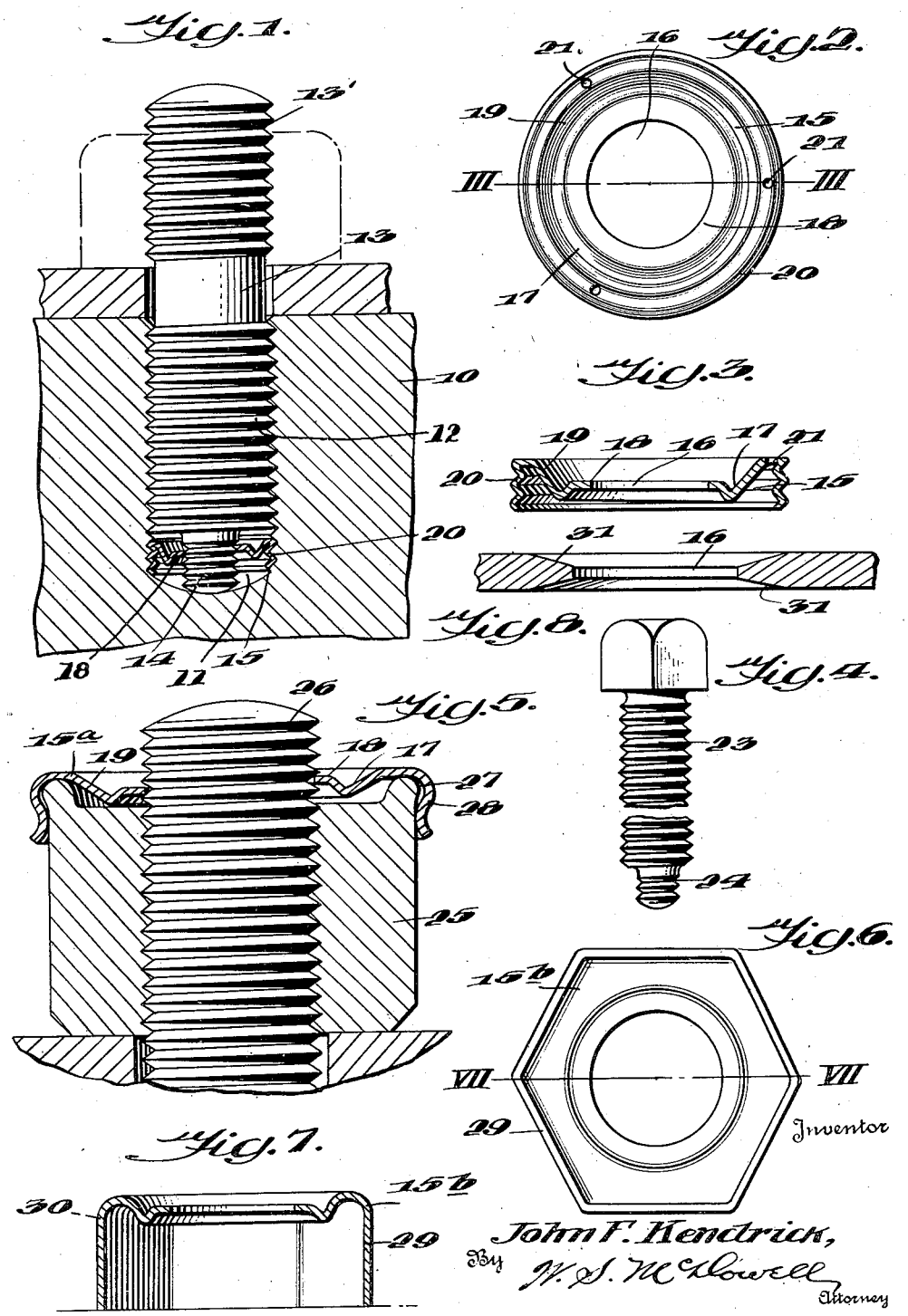

2,460,131

UNITED STATES PATENT OFFICE 2,460,131

NUT OR BOLT LOCK

John F. Kendrick, Elizabeth, N. J.

Application January 19, 1944, Serial No. 518,813

7 Claims. (Cl. 151—32)

This application forms a continuation-in-part of my prior application, Serial No. 504,736, filed October 2, 1943, Self-locking nut, which was issued as Patent 2,439,253, April 6, 1948. This continuation-in-part has been divided into application Serial No. 762,945, filed July 23, 1947, Tilting diaphragm lock nut.

This invention, in its broader aspects, is concerned with devices for locking, fastening or retaining threaded bodies in fixed or other desired positions of adjustment. In one of its more specific aspects, the invention has to do with the provision of novel means for fastening the threaded shanks of bolts, shafts, screws and other male members in internally threaded openings, bores or sockets of receiving or female members. Conversely, the invention is also directed to the locking, fastening or holding of internally threaded bodies, such as nuts, collars and other machine parts on externally threaded elements, whereby to preclude undesired relative rotation therebetween.

It is an object of the present to provide an improved fastener or rotation-precluding means for use in association with threaded elements, wherein the fastener comprises a relatively thin disk-like metallic body having an opening in the axial center thereof whose diameter is less than that of the major but greater than that of the minor diameter of the threads on the element receivable therein, the region of said body around said opening being resiliently flexible, possessing a thickness which is but a fractional part of that of the pitch of the threads on the associated element, so that when said element is positioned in the opening of said fastener, with the latter supported in a fixed plane substantially perpendicular to the longitudinal axis of the element, the helix angle of the threads of said element serves to flex the resilient central regions of the fastener to cause the latter to exert a frictional binding action on said threads to restrain an associated threaded member against undesired rotation with respect to said element.

It is another object of the invention to provide an integral fastener or locking device for screw-threaded elements formed from a single blank of relatively thin resilient stock and provided with an axially located bolt-receiving opening having a diameter and wall thickness as defined in the immediately preceding paragraph, whereby when the fastener or locking device is operatively positioned in engagement with the external threads of a bolt or other element, the body of the fastener is resiliently flexed so that the lip thereof around said opening, through a wedging action exerted by the helix angle of the engaged threads, bears in part against the under side of an upper thread portion and, another part, against the upper side of the next adjacent lower thread portion, thereby enabling the lip and the resilient body of the fastener to respond to bolt vibrations with a rocking motion, performing their fastening or locking function under a wide variety of conditions imposed by practical usages.

A further object is to provide a fastener or locking device for threaded elements having the general structural characteristics above set forth, and wherein the diameter of the bolt-receiving opening is greater than the minor diameter of the bolt threads, so that the fastener is rendered virtually independent of rigorous dimensional tolerances, either on the part of the fastener itself or the threaded machine elements associated therewith, a feature which enables the fastener to function effectively as, for instance, where an associated bolt is oversized or undersized, and, moreover, prevents the fastener from applying radially and inwardly directed pressures on the root portions of the bolt threads, thereby precluding damaging of anti-corrosion finishes which may be applied to the threads.

Other objects of the invention are: to provide a fastener for threaded elements characterized by its thin compact and efficient design; to provide a fastener which does not appreciably decrease nor enlarge the usual physical dimensions of threaded elements associated therewith; to provide a separate fastener which may be applied readily to associated threaded elements in a quick and time-saving manner, and, finally, to provide a fastener which is simple in construction and adapted for economical use and manufacture.

For a further understanding of the invention, reference is to be had to the following description and the accompanying drawings, wherein:

Fig. 1 is a vertical sectional view, partly in side elevation, of a threaded stud of the oval dog-point type retained in a threaded socket with the use of a fastening or locking device formed in accordance with the present invention;

Fig. 2 is an enlarged bottom plan view of the locking or fastening device when removed from the stud;

Fig. 3 is a vertical transverse sectional view taken on the plane indicated by the line III—III of Fig. 2;

Fig. 4 is a detail elevational view of a cap screw of the dog-point type and formed to receive the separable locking or fastening device comprising the present invention;

Fig. 5 is a detail vertical sectional view, partly in side elevation taken through a nut formed to receive my improved locking or fastening device;

Fig. 6 is a bottom plan view illustrating my improved locking or fastening device when formed with an outer polygonal flange adapting it for application on a standard nut;

Fig. 7 is a vertical sectional view taken through the device on the plane disclosed by the line VII—VII of Fig. 6;

Fig. 8 is a similar view of a further modified form of fastener.

Fig. 9 is a top plan view of a locking nut formed in accordance with the present invention;

Fig. 10 is a plan view of another modified form of locking element;

Fig. 11 is a transverse sectional view taken on the plane disclosed by the line XI—XI of Fig. 10;

Fig. 12 is a plan view showing a still further modification of the locking element;

Fig. 13 is a vertical sectional view taken through a locking nut employing a plain disk-like locking element;

Fig. 14 is a vertical transverse sectional view on the line XIV—XIV of Fig. 12.

Referring more particularly to the drawing, and especially to Figs. 1 to 3 thereof, the numeral 10 designates a suitable base or machine part having formed therein an internally threaded socket, bore or opening 11. Adapted to be received within this socket is an externally threaded stud bolt 12, the latter being provided with a wrench receiving portion 13, an upper nut-receiving portion 13' and, at its lower end, a diametrically reduced threaded dog-point extension 14.

Adapted to be threaded into the bottom of the socket 11 is a bolt fastener 15 which, in the particular adaptation thereof under consideration, comprises a disk-like body composed of a metal having the desired degree of thickness and flexibility consistent with its intended fastening or locking functions, and while many materials may be employed in its formation, I have found that alloys of beryllium such as beryllium copper, have satisfactory properties. It will be understood, of course, that any suitable materials may be employed in this capacity including the so-called plastics.

In this instance, the fastening device is of integral or one-piece construction and is provided with an axially disposed element-receiving opening 16. The diameter of this opening is greater than that of the minor or root diameter of the threads provided on the bolt extension 14 and is less than that of the major diameter of said threads. An aperture diameter approximating the average of the pitch and major diameters of the externally threaded member will be satisfactory in a wide range of applications. Also, the thickness of the material of the fastener surrounding the opening 16 is but a fractional part of the pitch of the threads with which the fastener engages, for instance, one-half to one-fourth thereof.

To increase the resiliency of the body of the fastener, said body is formed, in a preferred design, to provide a resilient annular rib 17 which terminates inwardly in a thread-contacting, substantially horizontally disposed lip 18. Outwardly, the rib 17 terminates in an annularly and upwardly extending frusto-conical wall 19, and the outer perimeter of the wall 19 merges into the upper part of a depending outer, threaded flange 20, the latter being of such size as to receive the threads of the socket 11, permitting the fastener to be threaded into the bottom of said socket, as shown in Fig. 1.

While this cross-sectional configuration of the fastener is one which possesses considerable utility, it is, of course, subject to variation, as the disk body of the fastener may be of the flat type illustrated in Fig. 13 or any one of the forms illustrated in Figs. 9 to 14, inclusive. In the manufacture of the smaller sizes, a simple flat disk, such as is shown at 48, Fig. 13, with a bolt-receiving opening in its center, and having its outer circumferential edge non-rotatively attached to the body of the associated nut, will be all that is required in most cases, due to the small helix angle of the bolt thread. On larger sizes and for closer threads, the locking washer may be given increased resiliency, particularly in its outer region, to provide for a stronger gripping action. The locking washers 33 of Fig. 9 and 42 of Fig. 12 have been provided with a plurality of radiating spokes or tongues or elastic members, which may be so formed as to impart axial and radial resilience to the thread-engaging edge and also be formed for non-rotating attachment to the internally threaded member. These radially disposed elastic members may obviously be combined with a rigidity increasing corrugation, as at 39, Fig. 11, concentrically disposed between the elastic members and an annular thread engaging edge. In Figs. 10 and 11, a plain disk is shown at 39, the same being corrugated as at 40 between the walls of its bolt-receiving opening and its outer circumferential edge, to impart radial and axial resiliency to the thread-engaging edge. In Figs. 12 and 14, a similar arrangement is disclosed, except that disk 42 is provided with circumferentially disposed recesses 43, producing therebetween securing spokes or elastic members 44. All these disks may be modified at the outer circumference for non-rotative attachment to the internally threaded member in the ways illustrated in the other figures.

With the parts operatively positioned as shown in Fig. 1, consideration will disclose that the unbroken annular lip 18 of the fastener engages with the threads of the bolt extension 14 in such manner as to exert a resilient and frictional binding action thereon. When the fastener is located in the bottom of the socket, prior to the introduction of the stud bolt therein, the lip 18 is disposed in a substantially horizontal plane perpendicular to the longitudinal axis of the socket. When the bolt 12 is threaded into the socket, the dog-point extension 14 thereof is threaded into the opening 16 of the fastener. This operation results in flexing the resilient central region of the fastener defined by the rib 17, the lip 18 and the wall 19, due to the helix angle of the thread on the extension 14 and this flexing or distortion of the fastener is utilized in producing the pressures or drag forces necessary to retain positively the bolt against undesired rotation.

It will be noted that I utilize a round unbroken opening to receive the bolt or screw. This construction is employed in order to deform the lip 16 of the opening as little as possible when in contact with the bolt threads, the force of the locking action being obtained from the resiliency built into the outer circumference of the disk-like body of the fastener. The lip is deflected or tilted through a wedging action produced by the helix angle of the engaged threads, under which, in most applications, part of the annular lip bears against the under side of the upper thread and another part bears against the upper side of the lower thread, as shown in Fig. 5. The fastener, therefore, will respond to the vibration of an associated bolt with a rocking motion and performs its locking function under a wide variety of conditions. The construction is independent of rigorous tolerances on the part of the disk or bolt and, within practical limits, will function equally well whether the bolt is oversized or undersized. The fastener may be provided with wrench-receiving openings 21 around its outer margin to facilitate the threading of the fastener into or from the bottom of the socket 11.

A fastener so formed is adapted for use in connection with many different externally threaded machine elements, such as bolts, shafts, set screws or the like. In Fig. 4, there has been illustrated a cap screw 23 having the outer end of its threaded shank provided with an externally threaded dog-point extension 24, which is adapted for engagement with a fastener 15 in the same manner as the extension 14 of the bolt 12. Likewise, the fastener may be used in connection with internally threaded elements, such as the nut 25, illustrated in Fig. 5.

The nut 25 may be formed to comprise a body having an internally threaded bore adapted for the reception of an externally threaded bolt 26. The outer end of the nut is formed with an outwardly projecting annular bead 27 having vertically grooved roughened or knurled external surfaces. The fastener 15a, used in securing the nut 25 to the threaded shank of a bolt 26, has the same general features of construction as the fastener 15, previously described, but, in this instance, is modified to include resilient lip or lips around its outer periphery, which is or are adapted resiliently to snap over the bead 27. The internal surfaces of the lip 28 may likewise be knurled or roughened to engage with corresponding indentations of the bead, whereby to hold the fastener 15a against relative rotation on the nut.

Another variation of the invention has been illustrated in Figs. 6 and 7 wherein the fastener 15b is provided with a polygonal external flange 29 which conforms closely to the outer configuration of a standard nut 30. The outer surfaces of the nut are received within the flange 29 and the entire assembly may then be threaded on the shank of an associated bolt, the polygonal flange serving to prevent rotation of the fastener 15b relative to the nut 30.

In Fig. 8, the thread-engaging edge of the locking element is shown countersunk or tapered radially on both sides of the disk or plate. This may be used on any of the modifications of the locking element shown. Its use permits increased contact area between the thread-engaging edge and the external thread of the cooperating member and permits the thread-engaging edge to enter the thread groove of the externally threaded member where a thicker plate or disk is desirable to increase the magnitude of the locking or restraining force, as will be required in the larger sizes of the cooperating threaded members.

Consideration of these forms of my invention will disclose that the same provides a locking element for cooperating screw-threaded members which is formed to provide a relatively thin metallic plate or disk having a centrally located bolt-receiving opening, as at 16. The latter is formed with a thread-engaging region possessing a smooth, uninterrupted annular edge, the body of the plate or disk immediately around said opening being relatively stiff and inflexible. The diameter of the opening approximates the pitch diameter of the threads engaged thereby, and the thickness of the plate is such as to enable its thread-engaging edge to enter a thread groove of an externally threaded chamfered bolt, such as those indicated at 14, 24 and 26. The outer portion of the locking element, around the rigid apertured central region thereof, as shown particularly in Figs. 3 and 5 of the drawings, is provided with a rigidity-increasing rib, as indicated at 17 in Figs. 3 and 5, and an outer resiliency-affording region, as shown at 21 in Fig. 3 and 28 in Fig. 5. In Fig. 8, the bolt-engaging region of the locking element is provided with the radially tapered surfaces 31, so that the locking element may be formed from somewhat heavier stock in the case of large bolts. In Fig. 3, the locking element includes an outer threaded shell 20 which is adapted to engage the internal threads provided in the tapped opening or hole of the member 10. The locking tongues, shown at 28 in Fig. 5, have resilient or elastic and non-rotatable engagement with the nut 25. The tongues 28 impart resiliency to the locking element so as to permit the thread-engaging edge region of the bolt opening therein to be tilted by the helix angle of the engaging threads, whereby adjacent threads of the cooperating external and internally threaded members are restrained against relative movement.

As stated in my original application, Serial No. 504,736, of which this is a continuation-in-part, the action of the locking element may be visualized if we consider a small piece of light gauge sheet metal, with an opening drilled or punched in its having a diameter about equal to the pitch diameter of the threads of a bolt. If the thickness of the sheet metal is some fraction of the pitch of the bolt thread, for instance one-half to one-fourth thereof, it will be possible to screw the bolt into the opening, but in order to do so, it will be necessary to incline the bolt at an angle to the sheet metal approximately equal to the helix angle of the thread of the bolt. Under such conditions, it would not be necessary to thread or tap the walls of the opening in the sheet metal. However, if the sheet metal were fixed in a plane by clamping its outer edges and the bolt constrained so that its axis is approximately perpendicular to the plane of the sheet metal, it will be necessary for the sheet metal to have enough resiliency to twist before it would be possible to secure the bolt into the opening without threading the latter. This twisting action on the part of the plate, therefore, provides a suitable means for locking the nut to a bolt, and at the same time, provides a thin washer which makes possible the employment of a stronger nut body.

The operation of this locking element, therefore, involves the intertwining of the circular aperture of the disk or plate with the groove of the helix of the externally threaded member. It will be obvious that the crest of the external thread will cross the inside edge of the aperture in the disk or plate at some point. This necessitates some radial movement of the locking element with respect to the externally threaded member. When the diameter of the aperture is greater than the pitch diameter of the external threads, the usual manufacturing allowances will prove sufficient to prevent the binding of the crest of the male thread against the inside edge of the aperture or impressing of a portion of the thread on the inside edge of the aperture. If the diameter of the aperture is approximately equal to the pitch diameter of the external threads, some radial resiliency will be desirable in the locking element. The preferred result is the application of an axial locking force in a differential manner, that is in one axial direction on one side of the externally threaded member and in the opposite axial direction on the opposite side with neutral zones inbetween. The preferred design, therefore, will be to proportion the aperture so as to avoid the keying effect of impressing a portion of a thread on the inside edge of the aperture.

In view of the foregoing, it will be seen that the present invention provides simple, effective and practical means for retaining screw threaded bodies in fixed positions of adjustment, preventing accidental or undesired rotation thereof from desired operative positions. The fastener, forming the present invention, is applicable with but slight modification for various types of threaded elements but in all its practical adaptations, the essential features of the fastener remain constant. Also, the fastener possesses the advantage of being easy to apply to the work at hand and does not materially add to its cost.

I claim:

1. Locking means for cooperating threaded members of the type having an externally threaded member positioned in an internally threaded hole, comprising an externally threaded member formed at one end with a reduced-diameter externally threaded extension, an internally threaded member, said threads possessing the customary clearances, crests, grooves, minor, major and pitch diameters and helix angles and a locking element comprising a thin unthreaded, coaxially apertured resilient plate, the aperture of which defines a thread-engaging edge possessing an uninterrupted, continuous and circular form, said plate being proportioned to impart axial resilience to said thread-engaging edge, the thickness of the thread-engaging edge being such as will permit it to enter the thread-groove of the reduced-diameter externally threaded member and being such as will permit the thread-engaging edge to be tilted axially by the helix angle of the reduced-diameter externally threaded member, the diameter of the aperture being such as will permit the thread-engaging edge to cross the crest of the reduced-diameter external thread and reenter the external thread-groove, when the thread-engaging edge is deflected radially by the crest of the reduced-diameter external thread, thereby closing the clearance on one side of said cooperating threads, the outer portions of said plate being so formed to be threadedly engaged with the internally threaded member to position said aperture in longitudinal registration with and at right angles to the axis of said internally threaded member, the tilted thread-engaging edge applying an axial force to the internal threads and the reduced-diameter external threads, restraining relative rotation.

2. Locking means for cooperating threaded members of the type having an externally threaded member positioned in an internally threaded hole, comprising an externally threaded member formed at one end with a reduced-diameter externally threaded extension, an internally threaded member, said threads possessing the customary clearances, crests, grooves, minor, major and pitch diameters and helix angles and a locking element comprising a thin unthreaded, coaxially apertured resilient plate, the aperture of which defines a thread-engaging edge possessing an uninterrupted, continuous and circular form, said plate being proportioned to impart both radial and axial resilience to said thread-engaging edge, the thickness of the thread-engaging edge being such as will permit it to enter the thread-groove of the reduced-diameter externally threaded member and being such as will permit the thread-engaging edge to be tilted axially by the helix angle of the reduced-diameter externally threaded member, the diameter of the aperture being such as will permit the thread-engaging edge to cross the crest of the reduced-diameter external thread and reenter the external thread-groove, when the thread-engaging edge is deflected radially by the crest of the reduced-diameter external thread, the outer portions of said plate being so formed to be threadedly engaged with the internally threaded member to position said aperture in longitudinal registration with and at right angles to the axis of said internally threaded member, the radially deflected thread-engaging edge applying a radial force to the internal threads and the reduced-diameter external threads, restraining relative rotation.

3. Locking means for cooperating threaded members of the type having an externally threaded member positioned in an internally threaded hole, comprising an externally threaded member formed at one end with a reduced-diameter externally threaded extension, an internally threaded member, said threads possessing the customary clearances, crests, grooves, minor, major and pitch diameters and helix angles and a locking element comprising a thin unthreaded, coaxially apertured resilient plate, the aperture of which defines a thread-engaging edge possessing an uninterrupted, continuous and circular form, said plate being proportioned to impart both radial and axial resilience to said thread engaging edge, the thickness of the thread-engaging edge being such as will permit it to enter the thread-groove of the reduced-diameter externally threaded member and being such as will permit the thread-engaging edge to be tilted axially by the helix angle of the reduced-diameter externally threaded member, the diameter of the aperture being such as will permit the thread-engaging edge to cross the crest of the reduced-diameter external thread and reenter the external thread-groove, when the thread-engaging edge is deflected radially by the crest of the reduced-diameter external thread, the outer portions of said plate being so formed to be threadedly engaged with the internally threaded member to position said aperture in longitudinal registration with and at right angles to the axis of said internally threaded member, the tilted thread-engaging edge applying forces to the internal threads and the reduced-diameter external threads, axially and differentially, in one axial direction on one diameter of said threads and in the opposite axial direction on the opposite diameter of said threads, with neutral zones between, said force restraining relative rotation.

4. Locking means for cooperating threaded members of the type having an externally threaded member positioned in an internally threaded hole, comprising an externally threaded member formed at one end with a reduced-diameter externally threaded extension, an internally threaded member, said threads possessing the customary clearances, crests, grooves, minor, major and pitch diameters and helix angles and a locking element comprising a thin unthreaded, coaxially apertured resilient plate, the aperture of which defines an annular thread-engaging edge possessing an uninterrupted, continuous and circular form, said plate being corrugated concentrically to said annular thread-engaging edge and the outer portions of said plate to impart both radial and axial resilience to said thread-engaging edge, the thickness of the thread-engaging edge being such as will permit it to enter the thread-groove of the reduced-diameter externally threaded member and being such as will permit the thread-engaging edge to be tilted axially by the helix angle of the reduced-diameter externally threaded member, the diameter of the aperture approximating the average of the pitch and major diameters of the reduced-diameter external thread to permit the thread-engaging edge to cross the crest of the reduced-diameter external thread and reenter the external thread-groove, when the thread-engaging edge is deflected radially by the crest of the reduced-diameter external thread, the outer portions of said plate being so formed to be threadedly engaged with the internally threaded member to position said aperture in longitudinal registration with and at right angles to the axis of said internally threaded member, the radially deflected thread-engaging edge applying a radial force to the internal threads and the reduced-diameter external threads, restraining relative rotation.

5. Locking means for cooperating threaded members of the type having an externally threaded member positioned in an internally threaded hole, comprising an externally threaded member formed at one end with a reduced-diameter externally threaded extension, an internally threaded member, said threads possessing the customary clearances, crests, grooves, minor, major and pitch diameters and helix angles and a locking element comprising a thin unthreaded, coaxially apertured resilient plate, the aperture of which defines an annular thread-engaging edge possessing an uninterrupted, continuous and circular form, said plate being corrugated concentrically to said annular thread-engaging edge and the outer portions of said plate to impart both radial and axial resilience to said thread-engaging edge, the thickness of the thread-engaging edge being such as will permit it to enter the thread-groove of the reduced-diameter externally threaded member and being such as will permit the thread-engaging edge to be tilted axially by the helix angle of the reduced-diameter externally threaded member, the diameter of the aperture approximating the average of the pitch and major diameters of the reduced-diameter external thread to permit the thread-engaging edge to cross the crest of the reduced-diameter external thread and reenter the external thread-groove, when the thread-engaging edge is deflected radially by the crest of the reduced-diameter external thread, the outer portions of said plate being so formed to be threadedly engaged with the internally threaded member to position said aperture in longitudinal registration with and at right angles to the axis of said internally threaded member, the tilted thread-engaging edge applying forces to the internal threads and the reduced-diameter external threads, axially and differentially, in one axial direction on one diameter of said threads and in the opposite axial direction on the opposite diameter of said threads, with neutral zones between, said force restraining relative rotation.

6. Locking means for cooperating threaded members of the type having an externally threaded member positioned in an internally threaded hole, comprising an externally threaded member formed at one end with a reduced-diameter externally threaded extension, an internally threaded member, said threads possessing the customary clearances, crests, grooves, minor, major and pitch diameters and helix angles and a locking element comprising a thin unthreaded, coaxially apertured resilient plate, the aperture of which defines a thread-engaging edge possessing an uninterrupted, continuous and circular form, the outer portion of said plate being composed of a plurality of elastic spokes, radially disposed and so formed as to impart both radial and axial resilience to said thread-engaging edge, the thickness of the thread-engaging edge being such as will permit it to enter the thread-groove of the reduced-diameter externally threaded member and being such as will permit the thread-engaging edge to be tilted axially by the helix angle of the reduced-diameter externally threaded member, the diameter of the aperture approximating the average of the pitch and major diameters of the reduced-diameter external thread to permit the thread-engaging edge to cross the crest of the reduced-diameter external thread and reenter the external thread-groove, when the thread-engaging edge is deflected radially by the crest of the reduced-diameter external thread, the outer elastic radial spokes of said plate being further so formed to be threadedly engaged with the internally threaded member to position said aperture in longitudinal registration with and at right angles to the axis of said internally threaded member, the radially deflected thread-engaging edge applying a radial force to the internal threads and the reduced-diameter external threads, restraining relative rotation.

7. Locking means for cooperating threaded members of the type having an externally threaded member positioned in an internally threaded hole, comprising an externally threaded member formed at one end with a reduced-diameter externally threaded extension, an internally threaded member, said threads possessing the customary clearances, crests, grooves, minor, major and pitch diameters and helix angles and a locking element comprising a thin unthreaded, coaxially apertured resilient plate, the aperture of which defines a thread-engaging edge possessing an uninterrupted, continuous and circular form, the outer portion of said plate being composed of a plurality of elastic spokes, radially disposed and so formed as to impart both radial and axial resilience to said thread engaging edge, the thickness of the thread-engaging edge being such as will permit it to enter the thread-groove of the reduced-diameter externally threaded member and being such as will permit the thread-engaging edge to be tilted axially by the helix angle of the reduced-diameter externally threaded member, the diameter of the aperture approximating the average of the pitch and major diameters of the reduced-diameter external thread to permit the thread-engaging edge to cross the crest of the reduced-diameter external thread and reenter the external thread-groove, when the thread-engaging edge is deflected radially by the crest of the reduced-diameter external thread, the outer elastic radial spokes of said plate being further so formed to be threadedly engaged with the internally threaded member to position said aperture in longitudinal registration with and at right angles to the axis of said internally threaded member, the tilted thread-engaging edge applying forces to the internal threads and the reduced-diameter external threads, axially and differentially, in one axial direction on one diameter of said threads and in the opposite axial direction on the opposite diameter of said threads, with neutral zones between, said force restraining relative rotation.

JOHN F. KENDRICK.

REFERENCES CITED

The following references are of record in the file of this patent:

UNITED STATES PATENTS

| Number | Name | Date |
|---|---|---|
| 505,839 | Mills | Oct. 3, 1893 |
| 545,342 | Simmonds | May 20, 1942 |
| 2,196,637 | Luce | Apr. 9, 1940 |
| 2,374,241 | Simmonds | Apr. 24, 1945 |
| 2,375,325 | Robertson | May 8, 1945 |

FOREIGN PATENTS

| Number | Country | Date |
|---|---|---|
| 49,023 | Norway | May 15, 1933 |
| 445,509 | Germany | June 13, 1927 |
| 558,414 | Great Britain | Jan. 4, 1944 |